United States Patent
Chen

(10) Patent No.: US 7,637,647 B2
(45) Date of Patent: Dec. 29, 2009

(54) BACK LIGHT MODULE

(75) Inventor: Yan-Zuo Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/190,571

(22) Filed: Aug. 12, 2008

(65) Prior Publication Data
US 2009/0059620 A1 Mar. 5, 2009

(30) Foreign Application Priority Data
Aug. 28, 2007 (TW) ............................. 96131850 A

(51) Int. Cl.
*F21S 8/10* (2006.01)
*F21V 5/00* (2006.01)
(52) U.S. Cl. .................. 362/613; 362/335; 362/337; 362/334; 362/338
(58) Field of Classification Search .............. 362/600, 362/613, 335, 337, 338
See application file for complete search history.

(56) References Cited

U.S. PATENT DOCUMENTS

| | | | | |
|---|---|---|---|---|
| 1,557,563 A | * | 10/1925 | Dahlstrom | ............... 362/333 |
| 1,579,855 A | * | 4/1926 | Beyer | ............... 362/540 |
| 2,224,178 A | * | 12/1940 | Bitner | ............... 362/337 |
| 6,598,998 B2 | | 7/2003 | West et al. | |
| 6,679,621 B2 | | 1/2004 | West et al. | |
| 6,724,543 B1 | * | 4/2004 | Chinniah et al. | ............... 359/718 |
| 7,033,061 B1 | | 4/2006 | Wu | |
| 7,438,444 B2 | * | 10/2008 | Pao et al. | ............... 362/327 |
| 7,461,960 B2 | * | 12/2008 | Opolka et al. | ............... 362/545 |
| 2006/0152932 A1 | | 7/2006 | Wu | |

FOREIGN PATENT DOCUMENTS

| TW | I246606 | 1/2006 |
|---|---|---|
| TW | I254162 | 5/2006 |

* cited by examiner

*Primary Examiner*—Anabel M Ton
(74) *Attorney, Agent, or Firm*—Jianq Chyun IP Office

(57) ABSTRACT

A back light module including a back plate, a light source and a bar lens is disclosed. The bar lens includes a top and a bottom center transparent surfaces, a right and a left top total internal reflection surfaces, a right and a left first emitting surfaces, a right and a left second emitting surfaces, a right and a left bottom total internal reflection surfaces and a right and a left bottom incident surfaces. The center bottom transparent surface is located between the top center transparent surface and the light source. The connecting sequence along the right of bar lens from top center transparent surface is the right top total internal reflection surface, the right first emitting surface, the right second emitting surface, right bottom total internal reflection surface, the right incident surface and the center bottom transparent surface. The connecting sequence on the left is similar to the right.

18 Claims, 4 Drawing Sheets

BACK LIGHT MODULE

CROSS-REFERENCE TO RELATED APPLICATION

This application claims the priority benefit of Taiwan application serial no. 96131850, filed on Aug. 28, 2007. The entirety of the above-mentioned patent application is hereby incorporated by reference herein and made a part of this specification.

BACKGROUND OF THE INVENTION

1. Field of the Invention

The present invention relates to a light source module. More particularly, the present invention relates to a back light module.

2. Description of Related Art

In the current society, multimedia technology is quite developed mostly benefit from the development of semiconductor device or display apparatus. As for displays, liquid crystal display (LCD) having superior features such as high definition, good space utilization efficiency, low power consumption, and free of radiation has increasingly become mainstream of the market.

LCD panel does not have the light emitting function by itself, so it is necessary to dispose a back light module under a LCD panel, so as to provide a light source to the LCD panel. Besides, Light emitting diode (LED) has advantages of high brightness, low power consumption, long life, slight heat problem etc., so recently LED array has been widely used in the back light module.

In the current backlight modules are mainly classified into two types, namely, direct-type back light module and side-edge back light module.

FIG. 1 is a partial schematic cross-sectional view of a conventional back light module with a side-emitting light source. Referring to FIG. 1, a conventional back light module with a side-emitting light source 10 mainly includes a back plate 11, an LED 12, and a lens 13. The LED 12 is disposed above the back plate 11, and the lens 13 is disposed above the LED 12. The side emitting back light module 10 is achieved side emitting light mixing by using the LED 12 together with the lens 13 disposed above the LED 12, wherein the lens 13 has a proper shape. However, the conventional side emitting back light module 10 adopting the LED 12 has the following disadvantages.

1. The lens 13 is fabricated through plastic injection molding process which needs additional mold. It is requires to define a cavity for fitting the shape of lens 13 within the mold process, so the process for fabricating the lens 13 is quite complicated.

2. Horizontal side light emitting efficiency of the conventional side emitting back light module 10 is lower than the light emitting efficiency of the direct-type or the oblique-type back light module varied from the direct-type.

3. In the process of fabricating the LCD, in order to reduce the directly viewed lamp mura, it is necessary to add a light absorbing sheet placed between the LCD panel and the lens 13.

4. The lens 13 is a kind of plastic lens, so in the fabricating process, the lens 13 cannot undergo the welding process in a solder pot process.

SUMMARY OF THE INVENTION

Accordingly, the present invention is directed to provide a back light module having high light source uniformity.

The present invention provides a back light module including a back plate, a light source, and a bar lens. The light source is disposed on the back plate. The bar lens is disposed on the back plate and covers the light source. Particularly, the bar lens has a top center transparent surface, a right top total internal reflection surface, a right first emitting surface, a right second emitting surface, a right bottom total internal reflection surface, a right incident surface, a left top total internal reflection surface, a left first emitting surface, a left second emitting surface, a left bottom total internal reflection surface, a left incident surface, and a center bottom transparent surface. The top center transparent surface is disposed above the light source. The right top total internal reflection surface is connected to the top center transparent surface, and a first angle is formed between the right top total internal reflection surface and the back plate. The right first emitting surface is connected to the right top total internal reflection surface, and a second angle is formed between the right first emitting surface and the back plate. The right second emitting surface is connected to the right first emitting surface, and a third angle is formed between the right second emitting surface and the back plate. The right bottom total internal reflection surface is connected to the right second emitting surface, and a fourth angle is formed between the right bottom total internal reflection surface and the back plate. The right incident surface is connected to the right bottom total internal reflection surface, and a fifth angle is formed between the right incident surface and the back plate. The left top total internal reflection surface is connected to the top center transparent surface, and a sixth angle is formed between the left top total internal reflection surface and the back plate. The left first emitting surface is located on the left of the left top total internal reflection surface and connected to the left top total internal reflection surface, and a seventh angle is formed between the left first emitting surface and the back plate. The left second emitting surface is connected to the left first emitting surface, and an eighth angle is formed between the left second emitting surface and the back plate. The left bottom total internal reflection surface is connected to the left second emitting surface, and a ninth angle is formed between the left bottom total internal reflection surface and the back plate. The left incident surface is connected to the left bottom total internal reflection surface, and a tenth angle is formed between the left incident surface and the back plate. The center bottom transparent surface is connected to the left incident surface and the right incident surface, and located between the top center transparent surface and the light source.

In an embodiment of the present invention, the lens is a bar lens.

In an embodiment of the present invention, the first angle is between about 70 and about 80 degrees.

In an embodiment of the present invention, the second angle is between about 30 and about 40 degrees.

In an embodiment of the present invention, the third angle is between about 40 and about 70 degrees.

In an embodiment of the present invention, the fourth angle is between about 30 and about 40 degrees.

In an embodiment of the present invention, the fifth angle is between about 40 and about 70 degrees.

In an embodiment of the present invention, the sixth angle is between about 70 and about 80 degrees.

In an embodiment of the present invention, the seventh angle is between about 30 and about 40 degrees.

In an embodiment of the present invention, the eighth angle is between about 40 and about 70 degrees.

In an embodiment of the present invention, the ninth angle is between about 30 and about 40 degrees.

In an embodiment of the present invention, the tenth angle is between about 40 and about 70 degrees.

In an embodiment of the present invention, the lens further has a right connecting surface connected to the right incident surface and the right bottom total internal reflection surface.

In an embodiment of the present invention, the lens further has a left connecting surface connected to the left incident surface and the left bottom total internal reflection surface.

In an embodiment of the present invention, the material of the lens includes plastic.

In an embodiment of the present invention, the back light module further includes an optical film, and the bar lens is located under the optical film to support the optical film.

In an embodiment of the present invention, the optical film includes a diffuser sheet or a prism sheet. Based on the above mentioned, the left and the right sides of the bar lens of the present invention have incident surfaces, emitting surfaces, and total internal reflection surfaces, respectively. Therefore, light rays emitted by the light source can successfully exit after being split into left and right sides. In addition, the lens has top and bottom center transparent surfaces, so the light rays emitted upwards by the light source can successfully pass through the lens. In other words, as compared with the conventional art, the lamp mura is not easily generated in the back light module adopting the lens.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
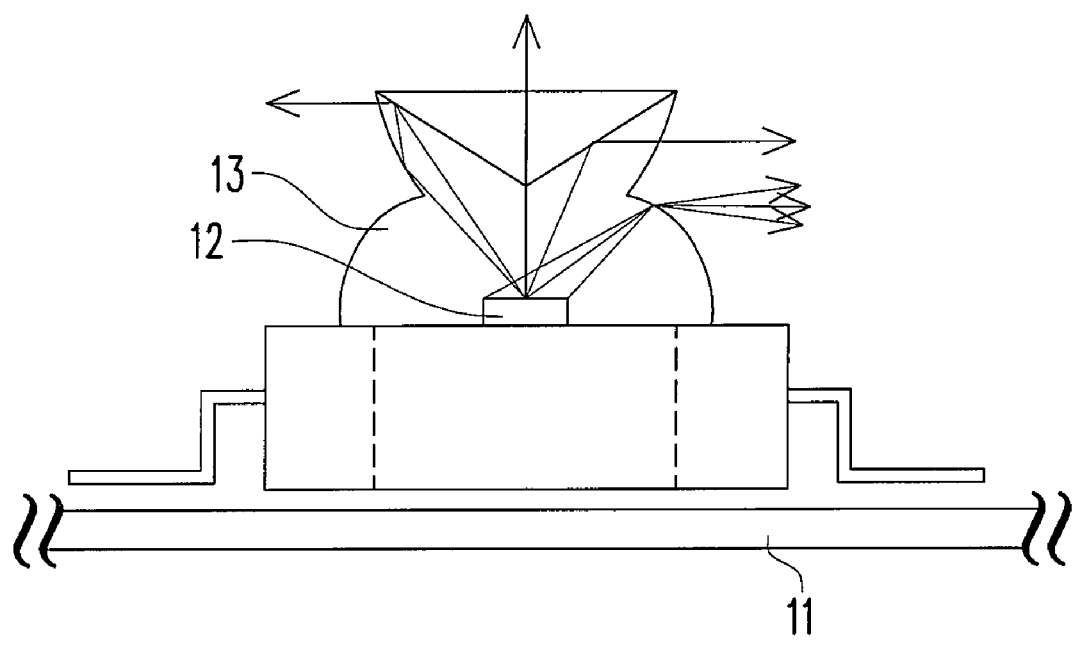
FIG. 1 is a partial schematic cross-sectional view of a side-emitting light source of a conventional back light module.
Figure 2:
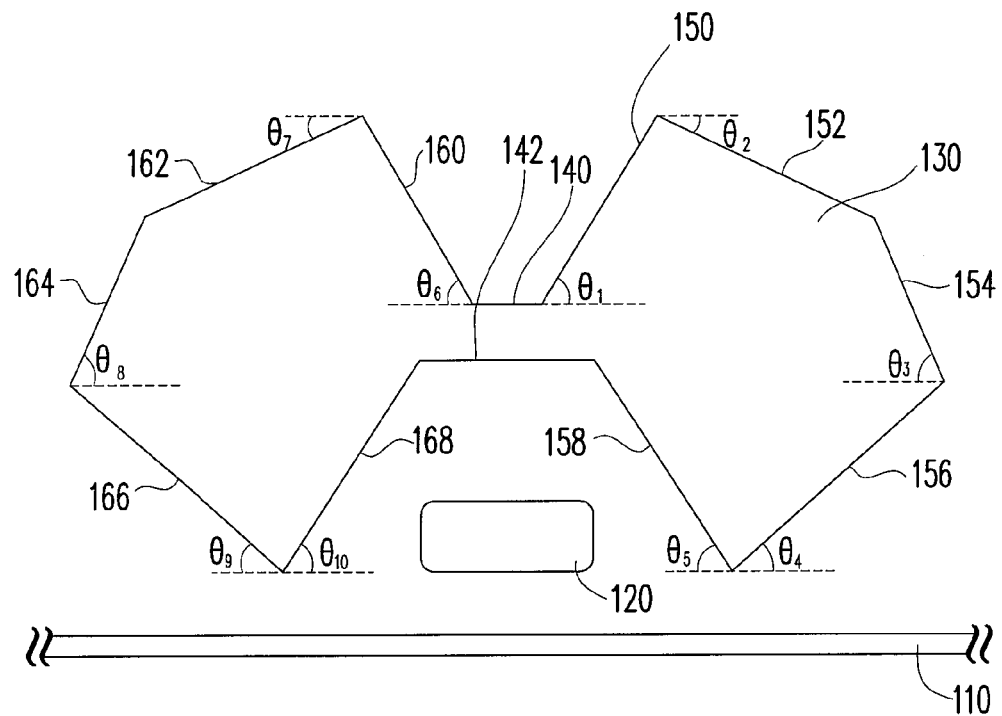
FIG. 2 is a schematic cross-sectional view of the back light module according to a first embodiment of the present invention.

FIG. 2 is a schematic cross-sectional view of the back light module according to the first embodiment of the present invention. In FIG. 2, only a part of the back light module is shown for illustration. Referring to FIG. 2, a back light module 100 of this embodiment includes a back plate 110, a light source 120, and a lens 130. In this embodiment, the lens 130 is a bar lens. The light source 120 is disposed on the back plate 110. The bar lens 130 is disposed on the back plate 110, and covers the light source 120. Particularly, the bar lens 130 has a top center transparent surface 140, a right top total internal reflection surface 150, a right first emitting surface 152, a right second emitting surface 154, a right bottom total internal reflection surface 156, a right incident surface 158, a left top total internal reflection surface 160, a left first emitting surface 162, a left second emitting surface 164, a left bottom total internal reflection surface 166, a left incident surface 168, and a center bottom transparent surface 142. The top center transparent surface 140 is disposed above the light source 120. The right top total internal reflection surface 150 is connected to the top center transparent surface 140, and a first angle $\theta_1$ is formed between the right top total internal reflection surface 150 and the back plate 110. The right first emitting surface 152 is connected to the right top total internal reflection surface 150, and a second angle $\theta_2$ is formed between the right first emitting surface 152 and the back plate 110. The right second emitting surface 154 is connected to the right first emitting surface 152, and a third angle $\theta_3$ is formed between the right second emitting surface 154 and the back plate 110. The right bottom total internal reflection surface 156 is connected to the right second emitting surface 154, and a fourth angle $\theta_4$ is formed between the right bottom total internal reflection surface 156 and the back plate 110. The right incident surface 158 is connected to the right bottom total internal reflection surface 156, and a fifth angle $\theta_5$ is formed between the right incident surface 158 and the back plate 110.

The left top total internal reflection surface 160 is connected to the top center transparent surface 140, and a sixth angle $\theta_6$ is formed between the left top total internal reflection surface 160 and the back plate 110. The left first emitting surface 162 is located on the left side of the left top total internal reflection surface 160 and connected to the left top total internal reflection surface 160, and a seventh angle $\theta_7$ is formed between the left first emitting surface 162 and the back plate 110. The left second emitting surface 164 is connected to the left first emitting surface 162, and an eighth angle $\theta_8$ is formed between the left second emitting surface 164 and the back plate 110. The left bottom total internal reflection surface 166 is connected to the left second emitting surface 164, and a ninth angle $\theta_9$ is formed between the left bottom total internal reflection surface 166 and the back plate 110. The left incident surface 168 is connected to the left bottom total internal reflection surface 166, and a tenth angle $\theta_{10}$ is formed between the left incident surface 168 and the back plate 110. The center bottom transparent surface 142 is connected to the left incident surface 168 and the right incident surface 158, and located between the top center transparent surface 140 and the light source 120.

In this embodiment, the first angle $\theta_1$ is preferably between about 70 and about 80 degrees. The second angle $\theta_2$ is preferably between about 30 and about 40 degrees. The third angle $\theta_3$ is preferably between about 40 and about 70 degrees. The fourth angle $\theta_4$ is preferably between about 30 and about 40 degrees. The fifth angle $\theta_5$ is preferably between about 40 and about 70 degrees. The sixth angle $\theta_6$ is preferably between about 70 and about 80 degrees. The seventh angle $\theta_7$ is preferably between about 30 and about 40 degrees. The eighth angle $\theta_8$ is preferably between about 40 and about 70 degrees. The ninth angle $\theta_9$ is preferably between about 30 and about 40 degrees. The tenth angle $\theta_{10}$ is preferably between about 40 and about 70 degrees.

It should be illustrated that the bar lens 130 can change the distribution angle of the light rays emitting from the light source. In this embodiment, the material of the bar lens 130 is preferably plastic. In other embodiments, the material of the bar lens 130 can also be glass or another material. Using the glass material to fabricate the bar lens 130 has the advantage of simple process. It can be known from FIG. 2 that the surfaces of the bar lens 130 are planes, so the process of fabricating the bar lens 130 of this embodiment is much easier than the conventional plastic injection molding process, and the fabrication cost can be reduced by grinding and cutting glass.

A plurality of total internal reflection surfaces of the bar lens 130 is not necessary to perform an additional coating or depositing process on fabrication. Besides, the plurality of total internal reflection surfaces can reflect the light rays to the outside so that the back light module 100 adopting the bar lens 130 does not easily generate the lamp mura. In addition, the back light module 100 of this embodiment can also adopt a plurality of light sources 120 and a plurality of bar lenses 130, so as to split more side lights, such that the display of the LCD becomes more uniform.

Second Embodiment

Figure 3:
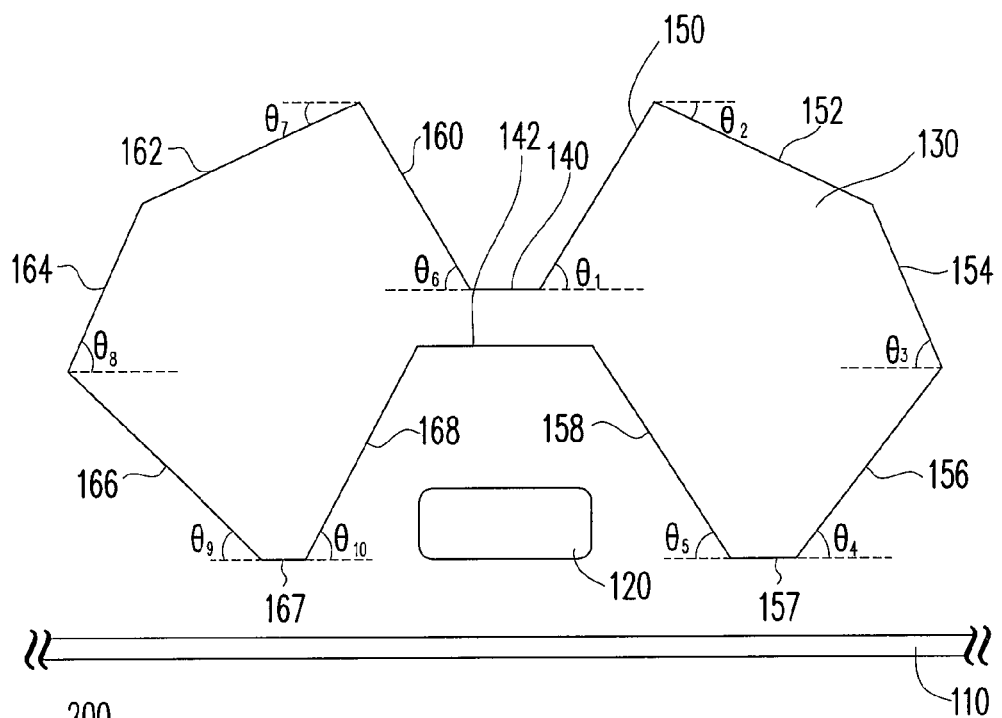
FIG. 3 is a schematic cross-sectional view of the back light module according to a second embodiment of the present invention.

FIG. 3 is a schematic cross-sectional view of the back light module according to the second embodiment of the present invention. Referring to FIG. 3, a back light module 200 of this embodiment is similar to the back light module 100 of the first embodiment, and the difference between the back light module 200 and the back light module 100 is that the bar lens 130 in the back light module 200 further includes a right connecting surface 157 and a left connecting surface 167, wherein the right connecting surface 157 and the left connecting surface 167 making the light path of the light source 120 pass through the bar lens 130 more successfully. The right connecting surface 157 is connected to the right incident surface 158 and the right bottom total internal reflection surface 156, and the left connecting surface 167 is connected to the left incident surface 168 and the left bottom total internal reflection surface 166. Therefore, the bar lens 130 can further split the light emitted by the light source 120 to oblique light with a desired angle to the LCD panel. However, in other embodiments, the bar lens 130 can also separately use the right connecting surface 157 or the left connecting surface 167. The quantity and position of the connecting surface are not limited in the present invention.

Third Embodiment

Figure 4:
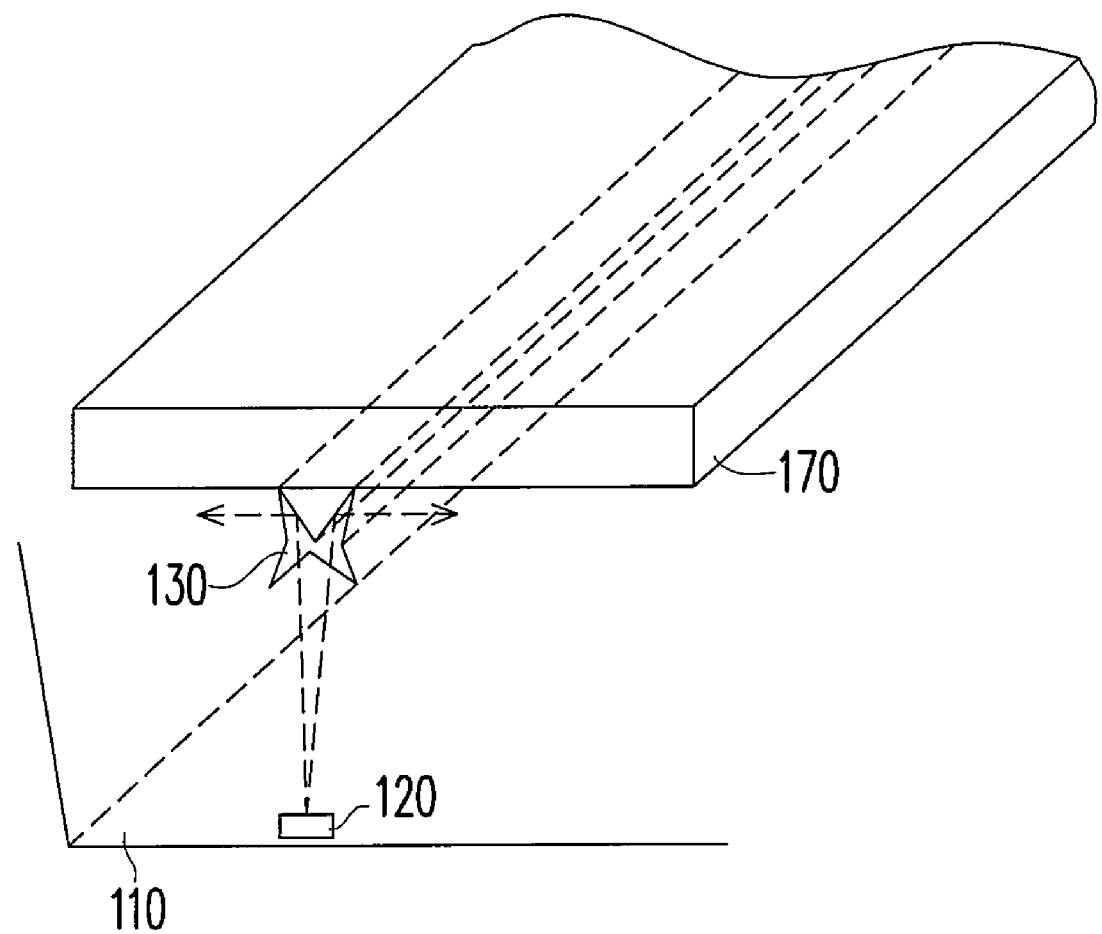
FIG. 4 is a schematic cross-sectional view of the back light module according to a third embodiment of the present invention.

FIG. 4 is a schematic cross-sectional view of the back light module according to the third embodiment of the present invention. Referring to FIG. 4, a back light module 300 of this embodiment is similar to the back light module 100 of the first embodiment, and the difference between the back light module 300 and the back light module 100 is that the back light module 300 of this embodiment further includes an optical film 170, and the bar lens 130 is disposed under the optical film 170 to support the optical film 170. Therefore, the bar lens 130 not only can enhance the light uniformity of the back light module 300, but also can support the optical film 170. In addition, the optical film 170 can be a diffuser sheet, a prism sheet, or another optical film.

Figure 5:
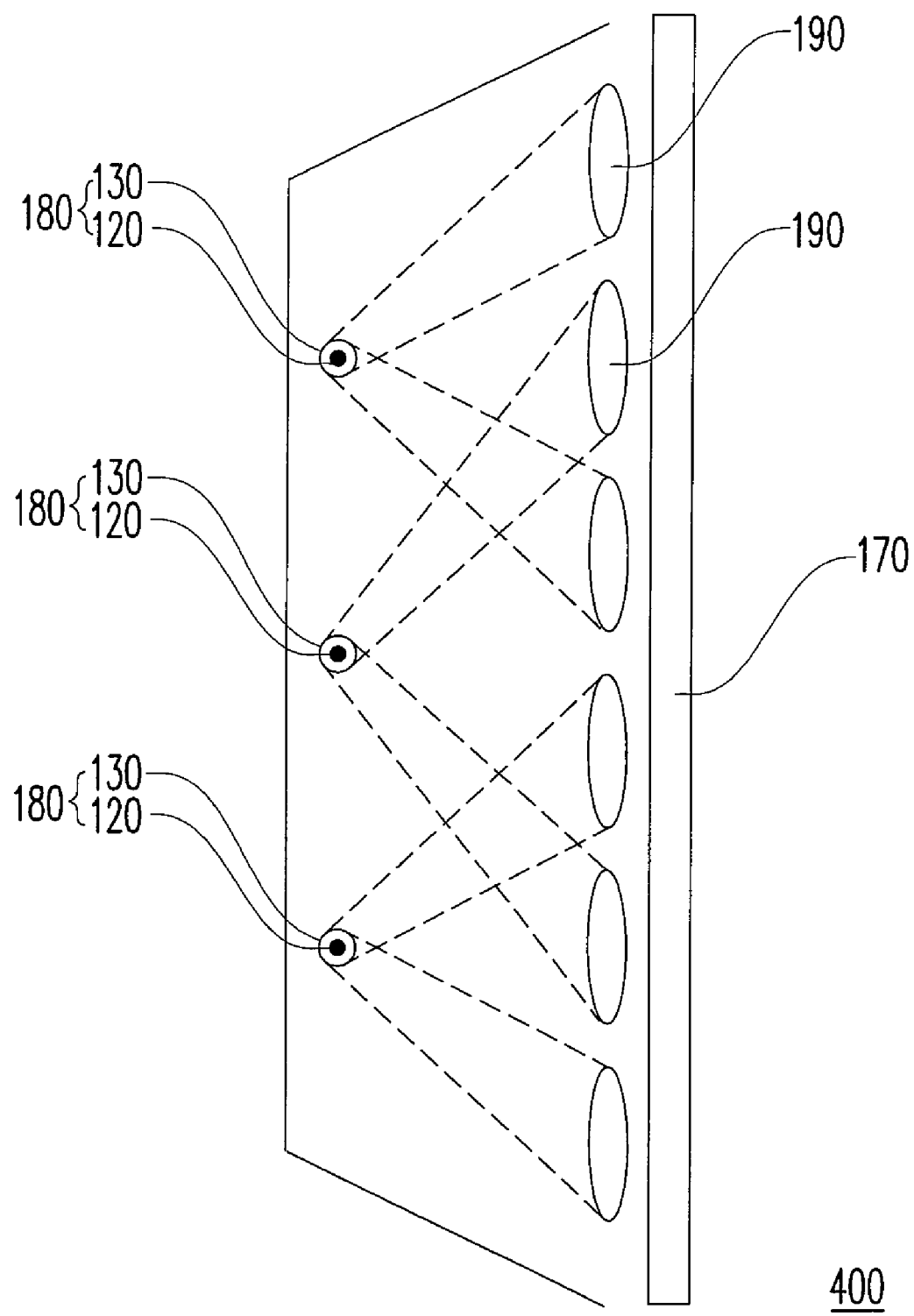
FIG. 5 is a schematic cross-sectional view of another back light module of the present invention.

FIG. 5 is a schematic cross-sectional view of another back light module of the present invention. Referring to FIG. 5, a back light module 400 includes a plurality of light emitting set 180 and an optical film 170, wherein each light emitting set 180 includes light sources 120 and a plurality of bar lens 130. As shown in FIG. 5, each light emitting set 180 provides two light emitting paths through the bar lens 130, and the light emitting paths form a light pattern 190 to the optical film 170.

In other words, the back light module 400 adopts the oblique-type light sources design, such that the light rays more uniformly exit onto the optical film 170, so as to further enhance the light uniformity of the back light module. In addition, the quantity of the bar lens and the light source disposing manner in the back light module are not limited in the present invention.

To sum up, the present invention at least has the following advantages.

1. The surfaces of the bar lens of the present invention are planes, so the fabricating process is relatively simple.

2. The bar lens of the present invention has a plurality of total internal reflection surfaces, so as to change the light path through these total internal reflection surfaces can reduce energy loss.

3. The bar lens of the present invention can decrease the light blending distance. In other words, the lights emitted from the light source can completely blending in a shorter distance. In addition, the oblique-type design can reduce the directly viewed lamp mura, thereby improving the yield of the LCD.

4. When a plurality of bar lenses and a plurality of light sources are used together, Those two split side light emitting from the light source could be interlaced with each other through adjusting the angle of each components in the bar lens, so as to increase the uniformity of the display of the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back light module, comprising:
   a back plate;
   a light source, disposed on the back plate;
   a lens, disposed on the back plate and covering the light source, wherein the bar lens comprises:
      a top center transparent surface, disposed above the light source;
      a right top total internal reflection surface, connected to the top center transparent surface, wherein a first angle is formed between the right top total internal reflection surface and the back plate;
      a right first emitting surface, connected to the right top total internal reflection surface, wherein a second angle is formed between the right first emitting surface and the back plate;
      a right second emitting surface, connected to the right first emitting surface, wherein a third angle is formed between the right second emitting surface and the back plate;
      a right bottom total internal reflection surface, connected to the right second emitting surface, wherein a fourth angle is formed between the right bottom total internal reflection surface and the back plate;
      a right incident surface, connected to the right bottom total internal reflection surface, wherein a fifth angle is formed between the right incident surface and the back plate;
      a left top total internal reflection surface, connected to the top center transparent surface, wherein a sixth angle is formed between the left top total internal reflection surface and the back plate;

a left first emitting surface, located on the left of the left top total internal reflection surface, and connected to the left top total internal reflection surface, wherein a seventh angle is formed between the left first emitting surface and the back plate;

a left second emitting surface, connected to the left first emitting surface, wherein an eighth angle is formed between the left second emitting surface and the back plate;

a left bottom total internal reflection surface, connected to the left second emitting surface, wherein a ninth angle is formed between the left bottom total internal reflection surface and the back plate;

a left incident surface, connected to the left bottom total internal reflection surface, wherein a tenth angle is formed between the left incident surface and the back plate; and a center bottom transparent surface, connected to the left incident surface and the right incident surface, and located between the top center transparent surface and the light source.

2. The back light module as claimed in claim 1, wherein the first angle is between 70 and 80 degrees.

3. The back light module as claimed in claim 1, wherein the second angle is between 30 and 40 degrees.

4. The back light module as claimed in claim 1, wherein the third angle is between 40 and 70 degrees.

5. The back light module as claimed in claim 1, wherein the fourth angle is between 30 and 40 degrees.

6. The back light module as claimed in claim 1, wherein the fifth angle is between 40 and 70 degrees.

7. The back light module as claimed in claim 1, wherein the sixth angle is between 70 and 80 degrees.

8. The back light module as claimed in claim 1, wherein the seventh angle is between 30 and 40 degrees.

9. The back light module as claimed in claim 1, wherein the eighth angle is between 40 and 70 degrees.

10. The back light module as claimed in claim 1, wherein the ninth angle is between 30 and 40 degrees.

11. The back light module as claimed in claim 1, wherein the tenth angle is between 40 and 70 degrees.

12. The back light module as claimed in claim 1, wherein the lens is a bar lens.

13. The back light module as claimed in claim 1, wherein the lens further has a right connecting surface connected to the right incident surface and the right bottom total internal reflection surface.

14. The back light module as claimed in claim 1, wherein the lens further has a left connecting surface connected to the left incident surface and the left bottom total internal reflection surface.

15. The back light module as claimed in claim 1, wherein the material of the lens comprises glass.

16. The back light module as claimed in claim 1, wherein the material of the lens comprises plastic.

17. The back light module as claimed in claim 1, further comprising an optical film, wherein the lens is located under the optical film to support the optical film.

18. The back light module as claimed in claim 17, wherein the optical film comprises a diffuser sheet or a prism sheet.

* * * * *